United States Patent
Kurina et al.

(10) Patent No.: US 10,381,119 B2
(45) Date of Patent: Aug. 13, 2019

(54) NUCLEAR FUEL PELLET HAVING ENHANCED THERMAL CONDUCTIVITY, AND PREPARATION METHOD THEREOF

(71) Applicant: Joint Stock Company "AKME-Engineering", Moscow (RU)

(72) Inventors: Irina Semyonovna Kurina, Obninsk (RU); Vjacheslav Vasilyevich Popov, Obninsk (RU); Vladimir Nikolaevich Rumyantsev, Obninsk (RU); Aleksander Evgenievich Rusanov, Obninsk (RU); Stepan Sergeevich Rogov, Obninsk (RU); Said Mirfaisovich Sharikpulov, Barvikha (RU)

(73) Assignee: Joint Stock Company "AKME-Engineering", Moscow (RU)

( * ) Notice: Subject to any disclaimer, the term of this patent is extended or adjusted under 35 U.S.C. 154(b) by 344 days.

(21) Appl. No.: 15/021,618

(22) PCT Filed: Nov. 21, 2014

(86) PCT No.: PCT/RU2014/000882
§ 371 (c)(1),
(2) Date: Mar. 11, 2016

(87) PCT Pub. No.: WO2015/080626
PCT Pub. Date: Jun. 4, 2015

(65) Prior Publication Data
US 2016/0232993 A1  Aug. 11, 2016

(30) Foreign Application Priority Data
Nov. 26, 2013  (RU) .................................. 2013152247

(51) Int. Cl.
*G21C 3/62*  (2006.01)
*G21C 21/02*  (2006.01)
(Continued)

(52) U.S. Cl.
CPC .............. *G21C 3/623* (2013.01); *G21C 3/044* (2013.01); *G21C 3/58* (2013.01); *G21C 21/02* (2013.01); *G21C 3/045* (2019.01); *Y02E 30/38* (2013.01)

(58) Field of Classification Search
CPC ........ G21C 3/623; G21C 21/02; G21C 3/044; G21C 3/58; G21C 2003/045; Y02E 30/38
See application file for complete search history.

(56) References Cited

U.S. PATENT DOCUMENTS

| 5,180,527 A * | 1/1993 | Hirai | G21C 3/62 252/638 |
| 2012/0183116 A1 | 7/2012 | Hollenbach et al. | |
| 2015/0221398 A1 * | 8/2015 | Subhash | G21C 21/02 376/409 |

FOREIGN PATENT DOCUMENTS

| JP | 01253694 | 10/1989 |
| JP | H01253694 A2 * | 10/1989 |

(Continued)

OTHER PUBLICATIONS

English Translation of JPH01253694 (Year: 1989).*
(Continued)

*Primary Examiner* — Peter F Godenschwager
*Assistant Examiner* — Andrew J. Oyer
(74) *Attorney, Agent, or Firm* — Preston Smirman; Smirman IP Law, PLLC

(57) ABSTRACT

The invention relates to nuclear physics, and specifically to reactor fuel elements and units thereof, and particularly to
(Continued)

1 Polycrystalline UO₂ according to J.H. Fink and M.C. Petry. Thermophysical Properties of Uranium Dioxide. ANL/Re-97/2.
2 Monocrystalline UO₂ according to V.B. Shevchenko, B.N. Sudarikov. Uranium Technology. Moscow: Gosatomizdat, 1961, 368 p.;
3 Standard UO₂ pellet;
4 Proposed UO₂ pellet according to the invention.

the composition of solid ceramic fuel elements based on uranium dioxide, intended for and exhibiting characteristics for being used in variously-purposed nuclear reactors. The result consists in a more reliable, special structure and a simple composition of uranium dioxide without heterogeneous fuel pellet additives, approaching the characteristics of a monocrystal having enhanced, and specifically exceeding reference data, thermal conductivity as temperature increases, and a simple production method thereof. The result is achieved in that pores of between 1 and 5 microns in size are distributed along the perimeters of grains in the micro-structure of each metal cluster in a nuclear fuel pellet, and in that located within the grains are pores which are predominantly nano-sized. In addition, the metal clusters comprise between 0.01 and 1.0 percent by mass. The invention provides for a method of preparing a nuclear fuel pellet, including precipitating metal hydroxides, in two stages, having different pH levels. Uranium metal is melted at a temperature exceeding 1150 DEG C., sintering is carried out in an insignificant amount of liquid phase at a temperature ranging between 1600 and 2200 DEG C. in a hydrogen medium until forming uranium dioxide, the structure of which includes metal clusters dispersed therein. An X-ray photon spectroscope is used for identifying the new structure of the UO2 pellet and the additional U—U chemical bond.

1 Claim, 3 Drawing Sheets

(51) Int. Cl.
*G21C 3/04* (2006.01)
*G21C 3/58* (2006.01)

(56) References Cited

FOREIGN PATENT DOCUMENTS

| RU | 2098870 | 12/1997 |
|---|---|---|
| RU | 2135429 | 8/1999 |
| RU | 2157568 | 10/2000 |
| RU | 2323912 | 5/2008 |
| RU | 2376665 | 7/2009 |
| RU | 2459289 | 6/2011 |
| RU | 2467411 | 12/2011 |
| RU | 2481657 | 3/2012 |
| RU | 2469427 | 12/2012 |
| WO | 2009128250 | 10/2009 |
| WO | 2011014476 | 2/2011 |

OTHER PUBLICATIONS

International Preliminary Report on Patentability dated May 31, 2016.
Translation of Written Opinion of the International Searching Authority dated Feb. 24, 2015.
Written Opinion of the International Searching Authority dated Feb. 24, 2015.
Translation of International Search Report dated Feb. 27, 2015.
International Search Report dated Feb. 27, 2015.
I. S. Kurina et al., "Research and Development of MGO Based Matrix Fuel," Proceedings of a Technical Committee Meeting Held in Moscow, Oct. 1-4, 1996, IAEA-TECDOC-970, 1997, p. 169-181.
I. S. Kurina, "Improvement of Uranium Dioxide Fuel Preparation Technology for Improved Performance," Digest of the 1st All-Russian Workshop of Undergraduate, Post-Graduate Students, Young Researchers in Topical Areas of Activities of the Functional Nanomaterials for Energy National Network for Nanotechnology, Moscow, National Research University Mephi, 2011, p. 117-146.
English Abstract of JP 01253694.
English Abstract of RU 2323912.
Senanayake, S. D. et al., "Carbon Monoxide Reaction With UO2 (111) Single Crystal Surfaces: A Theoretical and Experimental Study," J. Vac. Sci. Technol. A, 2005, vol. 23, No. 4, pp. 1078-1084.
Chong, Shen Vun, "Interactions of Oxygenated Organic Molecules on the (111) Surfaces of a Uranium Dioxide Single Crystal. A Thesis Submitted in Fulfillment of the Requirements for the Degree of Doctor of Philosophy in Chemistry," The University of Aukland, New Zealand, Jun. 2001.
Fink, J., "Thermophysical Properties of Uranium Dioxide," J. Nucl. Mat., 2000, vol. 279, Issue 1, pp. 1-18.
Gubin, S. P., "Cluster Chemistry. Classification and Structure [in Russian]," Nauka, Moscow, 1987, pp. 15-16.
Moulder, J.F. et al., "Handbook of X-Ray Photoelectron Spectroscopy," Perkin-Elmer Corporation, Eden Prairie, Minnesota, United States of America, Date Unknown, p. 192.

\* cited by examiner

1 Polycrystalline UO₂ according to J.H. Fink and M.C. Petry. Thermophysical Properties of Uranium Dioxide, ANL/Re-97/2.
2 Monocrystalline UO₂ according to V.B. Shevchenko, B.N. Sudarikov. Uranium Technology. Moscow: Gosatomizdat, 1961, 368 p.;
3 Standard UO₂ pellet;
4 Proposed UO₂ pellet according to the invention.

| Temperature, °C | Thermal conductivity factor, W/m·deg., UO$_2$ pellets | | | |
|---|---|---|---|---|
| | Reference data | | standard | proposed |
| | polycrystalline *) | monocrystalline **) | | |
| 150 | 8.1 | 8.1 | | 10 |
| 200 | 7.3 | 7.2 | 8.5 | 9.3 |
| 300 | 6.2 | 6.25 | 7.2 | 8.3 |
| 400 | 5.5 | 5.75 | 6.1 | 7.8 |
| 500 | 4.9 | 5.4 | 5.2 | 7.6 |
| 600 | 4.4 | 5.25 | 4.7 | 7.6 |
| 700 | 4 | 5.2 | 4.3 | 7.85 |
| 800 | 3.7 | 5.25 | 4 | 8.2 |
| 900 | 3.4 | 5.5 | 3.8 | 8.7 |
| 1000 | | 6 | | |

*) according to J.H. Fink and M.C. Petry. Thermophysical Properties of Uranium Dioxide. ANL/Re.- 97/2.

**) according to V.B. Shevchenko, B.N. Sudarikov. Uranium Technology. Moscow: Gosatomizdat, 1961, 368 p.

Fig. 5

NUCLEAR FUEL PELLET HAVING ENHANCED THERMAL CONDUCTIVITY, AND PREPARATION METHOD THEREOF

CROSS-REFERENCE TO RELATED APPLICATION

The instant application is a national phase of PCT International Application No. PCT/RU2014/000882 filed Nov. 21, 2014, and claims priority to Russian Patent Application Serial No. 2013152247, filed Nov. 26, 2013, the entire specifications of both of which are expressly incorporated herein by reference.

DESCRIPTION OF THE INVENTION

The invention relates to nuclear power industry and specifically to reactor fuel elements and units thereof, in particular to the composition of solid ceramic fuel elements based on uranium dioxide intended for and exhibiting characteristics for application in various-purpose nuclear reactors.

A pellet of nano-structured nuclear fuel (its embodiments) is known that contains pressed and sintered powder of a mixture of particles of a U compound and a nanodiamond uniform in effective size and density, in addition, it may contain pressed and sintered powder of a mixture of particles of the compound (U, Pu) and nanodiamond (Patent No. 2467411RU. Published Nov. 20, 2012).

However, notwithstanding the improved strength and heat resistance of the known pellet, it has low thermal conductivity, moreover, introduction of more than 1% of nanodiamond in $UO_2$ or $(U,Pu)O_2$ results in a decreased effective density of the nuclear fuel and may cause an accident during reactor operation as diamond reacts to form graphite spontaneously and bursts to small fragments when heated to 2000° C. without access of air.

A high-burnup nuclear fuel pellet and preparation method thereof (embodiments) are known, where a pellet based on uranium dioxide contains aluminum and silicon oxides evenly distributed within the pellet volume, wherein, in relation to uranium, the content of aluminum amounts to between 0.005 and 0.03 wt %, that of silicon between 0.003 and 0.02 wt %, the weight ratio of aluminum to silicon is between 1.5 and 4, the size of uranium dioxide grain varies between 20 and 45 μm. Additionally, the pellet may contain gadolinium oxide evenly distributed in the pellet volume as a solid solution with uranium dioxide, wherein the content of gadolinium oxide in relation to uranium is between 0.3 and 10.0 wt %, or contain erbium oxide evenly distributed in the pellet volume as a solid solution with uranium dioxide, wherein the content of erbium oxide in relation to uranium is between 0.3 and 0.8 wt % (Patent No. 2376665RU. Published Dec. 20, 2009).

However, notwithstanding the fact that the known pellet results in an increased fuel burnup during its operation at up to 70 to 100 MW·day/kg U, it does not possess a simple structure, composition, or increased thermal conductivity. Moreover, it is not intended for load following operation of the reactor. Its preparation method is characterized by high production cost.

A nuclear fuel pellet based on uranium dioxide is known containing pressed and sintered powder of a mixture of uranium dioxide with erbium oxide ($Er_2O_3$), the content of which in nuclear fuel is between 0.46 and 0.64 wt % by erbium at the nominal weight percentage of U-235 in nuclear fuel between 2.6 and 2.8 wt %. The effective porosity of the pressed and sintered mixture of uranium dioxide ($UO_2$) with erbium oxide does not exceed 1% (Patent No. 2157568RU. Published Oct. 10, 2000).

While fuel burnup is increased by adding erbium oxide, it results in decreased thermal conductivity of the fuel and, therefore, in increased radial temperature gradient of the pellet and does not contribute to stable load following operation of the reactor.

A fuel composition of 40 wt. % of $UO_2$+60 wt % of MgO is known having thermal conductivity of 5.7 W/m·deg. at 1000° C. (~1.5 times higher than the design thermal conductivity) (I. S. Kurina, V. N. Lopatinsky, N. P. Yermolayev, N. N. Shevchenko. Research and Development of MgO based matrix fuel.—Proceedings of a Technical Committee meeting held in Moscow, 1-4 Oct. 1996. IAEA-TECDOC-970, 1997, p. 169-181).

However, the known fuel composition of $UO_2$+MgO comprises a significant amount of a diluent: MgO (60 wt %). Complete charging of existing reactors with fuel of such composition is not possible. For use in the existing fast or thermal reactors, the concentration of $^{235}U$ in the $UO_2$+MgO fuel must be increased. This would require considerable costs in connection with increased enrichment of fuel in $^{235}U$ and modification of fuel production process instrumentation based on nuclear safety.

A nuclear fuel pellet is known that is a composite uranium dioxide matrix with a heat-conducting phase located inside in a specific way. The fuel heat flux direction coincides with the heat-conducting phase orientation. Heat is transferred by monocrystalline particles of beryllium oxide of acicular or platelet shape, 40 to 200 μm in size, optically transparent, dispersed in the uranium dioxide matrix (U.S. Pat. No. 2,481,657. Published May 10, 2013).

However, while the known pellet allows to improve thermal conductivity of its material due to the composite structure of fuel, it does not possess a special structure having nanopores inside grains and metal clusters of uranium.

A nuclear fuel pellet (embodiments) is known containing pressed and sintered powder of a mixture of particles of a uranium compound and frame carbon structures uniform in density and effective particle size. One embodiment thereof is a zoned pellet, wherein the central cylindrical zone of the pellet has a lower volumetric content frame carbon structures, while the outer annular zone has a higher volumetric content. In particular cases, the content of frame carbon structures (fullerenes, carbon nanotubes, carbon nanofibers) in the mixture powder is between 1.5 and 12.5 vol. % for a mixture with $UO_2$ and 1.2 to 10.4 vol. % for a mixture with UN. (Patent No. 2469427RU. Published Dec. 10, 2012).

However, while the known pellet has improved strength, heat resistance, deceleration of occurrence and development of cracks, decreased probability of its destruction, it does not provide sufficient thermal conductivity at increased temperatures resulting from its reliable special structure and simple composition of uranium dioxide.

A modeled composite nuclear fuel pellet is known with up to 3 wt % of particles of ordered graphite or silicon carbide with high thermal conductivity, which allows improving its thermal conductivity. In the known technical solution, a composite grain of nuclear fuel contains a composite body with a $UO_2$ matrix and many particles of high proportions dispersed in the same, where these particles of high proportions have a higher thermal conductivity compared to that of the $UO_2$ matrix (Application No. PCT/US2010/043307; International Publication Number WO/2011/014476. Published Feb. 3, 2011).

However, particles of high thermal conductivity in the known pellet are fibers between 0.25 and 1.25 cm in length and between 5 and 15 μm in width (diameter) that are destroyed (broken, twisted, etc.) when mixed and pressed, thus losing their function of pellet thermal conductivity improvement. In addition, introduction of up to 3% of ordered graphite or silicon carbide in $UO_2$ results in decreased uranium capacity of nuclear fuel, and addition of graphite may cause an emergency during reactor operation.

A method of production of fuel pellets, fuel assemblies, and uranium powder applied therefor are known. Among fuel rods (13, 14, 15, 16, 17, 18, 19) the fuel assemblies are comprised of, fuel rods (16, 17, 18) are added each containing uranium oxide with a condensation rate of more than 5%, contain a Gd composite oxide.

Gd composite oxide is an oxide containing gadolinium and a rare earth element B other than gadolinium and represented by chemical formula Al—XGdXO2-0, 5X or Al—XGdXO1.5. The rare earth element may be cerium (Ce), lanthanum (La), erbium (Er) (International Application Number: International Application Number: PCT/JP2009/001708, International Filing Date: Apr. 14, 2009; International Publication Number: WO/2009/128250, Publication Date: Oct. 22, 2009).

A method of preparation of a fuel composition for fast-neutron reactors is known consisting in preparation of fissile material solutions of fissile materials, deposition with ammonia, powder thermal treatment to fissile material oxides followed by pellet pressing and sintering, wherein solutions of magnesium and iron are added at the solution preparation stage, and iron is restored to metallic state (Patent No. 2098870RU. Published Dec. 10, 1997).

However, the known method does not produce a more reliable special structure and a simple composition of uranium dioxide of the fuel pellet with enhanced thermal conductivity of fuel, namely above the reference data, at temperature increase.

A method of fabrication of ceramic products is known including the operations of deposition of metal carbonate, hydroxide, oxalate, etc. from a solution, residue thermal treatment, pressing and sintering, wherein the lower temperature limit of the residue thermal treatment is the recrystallization temperature, i. e that of the morphological change of particle shape (Patent No. 2135429 RU. Published Aug. 27, 1999).

However, the known method does not produce a more reliable special structure and a simple composition of uranium dioxide of the fuel pellet with enhanced thermal conductivity of fuel, namely above the reference data, at temperature increase.

A method of production of nuclear fuel pellets based on uranium dioxide is known consisting in addition of nanodispersed uranium hydride to the initial highly-dispersed uranium dioxide, thorough mixing of the components, vacuum drying of the mixture at 300 to 330° C., where uranium hydride decomposes to metal, pressing of pellets from the dries product and their dynamic vacuum sintering at 1500 to 1550° C. (Patent No. 2459289RU. Published Aug. 20, 2012).

However, the known method does not produce a more reliable special structure and a simple composition of uranium dioxide resulting in enhanced thermal conductivity of fuel, namely above the reference data, at temperature increase.

A modification of fuel pellets of uranium dioxide is known including addition of ammonia-containing additives to the standard $UO_2$ powder and improvement of their production process, preparation of oxide ceramic materials, including obtaining a residue containing simultaneously particles of various sizes, including nanoparticles, followed by incinerating at the optimum temperature (Kurina I.S. Improvement of Uranium Dioxide Fuel Preparation Technology for Improved Performance//Digest of the 1st All-Russian Workshop of Undergraduate, Post-Graduate Students, Young Researchers in Topical Areas of Activities of the Functional Nanomaterials for Energy National Network for Nanotechnology. Moscow, National Research Nuclear University MEPhI, 2011. PP. 117-146).

The said publication describes general approaches to modification of uranium dioxide fuel pellets that will not allow to obtain a reliable special structure of a fuel pellet and a simple composition of uranium dioxide with enhanced thermal conductivity of fuel, namely above the reference data, at temperature increase without their constructive elaboration.

The closest analogous technical solution is based on the properties of a nuclear fuel pellet that is a composite uranium dioxide matrix with its heat-conducting BeO phase located inside in a specific way. The fuel heat flux direction coincides with the heat-conducting phase orientation. Heat is transferred by optically transparent monocrystalline particles of beryllium oxide of acicular or platelet shape dispersed in the uranium dioxide matrix, between 40 and 200 μm in size, its content in the fuel between 1 and 10 wt %. The calculation shows that the increase of thermal conductivity at 1000° C. and BeO content of 3% by weight as compared to fuel in the form of $UO_2$ will be less than 21%. (U.S. Pat. No. 2,481,657. Published May 10, 2013).

However, the enhanced conductivity in the known pellet is achieved only if the thermal flow coincides with the heat-conducting phase orientation, which is practically unachievable during pellet preparation (mixing, pressing). In addition, preparation of such a thermally conductive phase of the single-crystal beryllium oxide is a complicated and massive production process that significantly increases the cost of the nuclear fuel production, while introduction of a sufficiently large amount of BeO to $UO_2$ leads to the decrease of the fuel uranium capacity. Moreover, the beryllium oxide is a reflector and moderator of neutrons and addition thereof will modify the reactor physics.

The method of nuclear fuel pellet fabrication closest to the proposed one is the method of fabrication of oxide ceramic products with enhanced thermal conductivity, including operations of preparation of an acid solution containing at least one metal cation, including a fissile one, sedimentation of salts or hydroxide of at least one metal from the solution, thermal treatment of the residue at a temperature at least equal to that of the morphological change of the residue particle shape, product pressing and sintering, where the metal hydroxide is subsided with ammonia in two stages, wherein the first stage pH value is lower than the pH of complete metal sedimentation by at least 0.5, and the second stage pH is between 9.5 and 10.5, the salt in the form of a metal oxalate is subsided with a concentrated solution of oxalic acid with a stoichiometry surplus of at least 20%, wherein large particles of at least 0.1 μm and 0.05 to 2.0 wt % of nanoparticles with the size up to 30 nm are generated in the residue (Patent No. 2323912RU. Published May 10, 2008).

However, the known method does not produce a nuclear fuel pellet of more reliable special structure and simple composition of uranium dioxide with enhanced thermal conductivity of fuel, namely above the reference data, at temperature increase.

The purpose of this invention is to develop a more reliable special structure and a simple composition of uranium dioxide without heterogeneous additives in a fuel pellet, and a simple method of preparation thereof, both resulting in approaching monocrystalline properties and enhanced thermal conductivity of fuel, namely above the reference data, at temperature increase.

Implementation of the invention yields the following technical results.

The proposed pellet and preparation method thereof are simple and low-cost.

The proposed pellet has a more reliable special structure and a simple composition of uranium dioxide without heterogeneous additives.

The proposed pellet prepared using the proposed method is close to the monocrystalline properties and shows almost no porosity. In addition, it has enhanced thermal conductivity, namely above the reference data, at temperature increase.

The proposed pellet has enhanced plasticity due to formation of metal clusters and provides stable load following operation of the reactor.

Additionally, the method of its preparation is rather low-cost, when conditions for uranium metal formation are provided.

The following essential features influence the achievement of the above technical results. The solution to the problem set consists in that a nuclear fuel pellet with enhanced thermal conductivity containing a structure of pressed and sintered uranium dioxide powder has its structure made up of pores evenly distributed along the grain boundaries and within the grains, wherein nanopores and metal clusters of uranium chemical compounds with a valency of 0 and $2^+$ are located inside the grains, and nanopores are between 1 and 200 nm in size and make up at least 50% of the total porosity, and metal clusters of a mixture of uranium chemical compounds with a valency of 0 and $2^+$ are surrounded by $UO_2$, in addition, the total content of metal clusters in the form of a mixture of uranium chemical compounds with a valency of 0 and $2^+$ is between 0.01 and 2 wt %. To produce a nuclear fuel pellet with enhanced thermal conductivity, a method of its preparation is applied including deposition of metal hydroxides with pH in two stages, incinerating, sintering of a uranium dioxide mixture powder and pressing, application of an X-ray photon spectrometer, with deposition performed by simultaneous draining of uranyl nitrate and ammonia solutions to the buffer at 55-60±2° C. in two stages: at the first stage, pH is maintained between 6.5 and 6.7, at the second stage, final deposition of polyuranate ammonia (PUA) is performed at pH level between 9.0 and 10.5, the incinerating is performed at temperatures between 600 and 680° C. until $UO_2$ reduction, uranium metal is melted at the temperature above 1150° C., the sintering is performed in a small amount of liquid phase in a hydrogen-nitrogen medium at temperatures between 1600 and 2200° C. until metal clusters are formed.

In an embodiment with an extended range of method application, the deposition is performed by simultaneous draining of the nitric-acid solution with uranium and added metal and ammonia to the buffer at 55-60±2° C. in two stages: at the first stage, pH is maintained between 7.0 and 7.2, at the second stage, final deposition of polyuranate ammonia (PUA) is performed at pH level between 8.0 and 8.5, wherein chromium, tin, titanium, aluminum, etc. are used as added metals.

When applying the standard technology, it is reasonable to stir in mechanically an ammonia-containing additive in the amount of 0.01 to 0.5% to the $UO_2$ powder, wherein the following is used as such ammonia-containing additive: ammonia carbonate or bicarbonate, paraphenylenediamine, triazole, etc.

This invention is illustrated by detailed description, examples of implementation and illustrations where:

FIG. 5 shows the temperature-dependence table of thermal conductivity of different uranium dioxide pellets.

Figure 1:
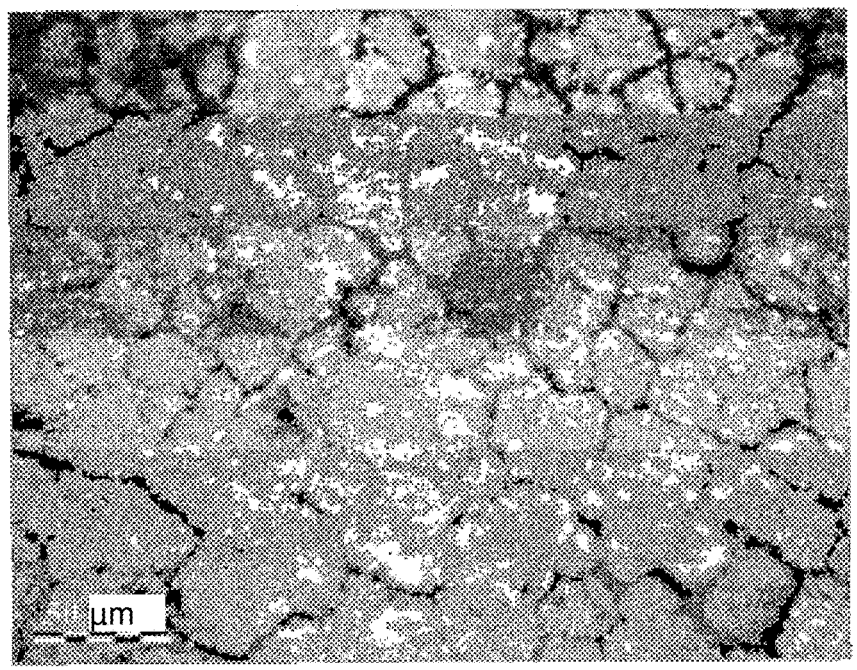
FIG. 1 shows the microstructure of the proposed nuclear fuel pellet according to the invention.
Figure 2:
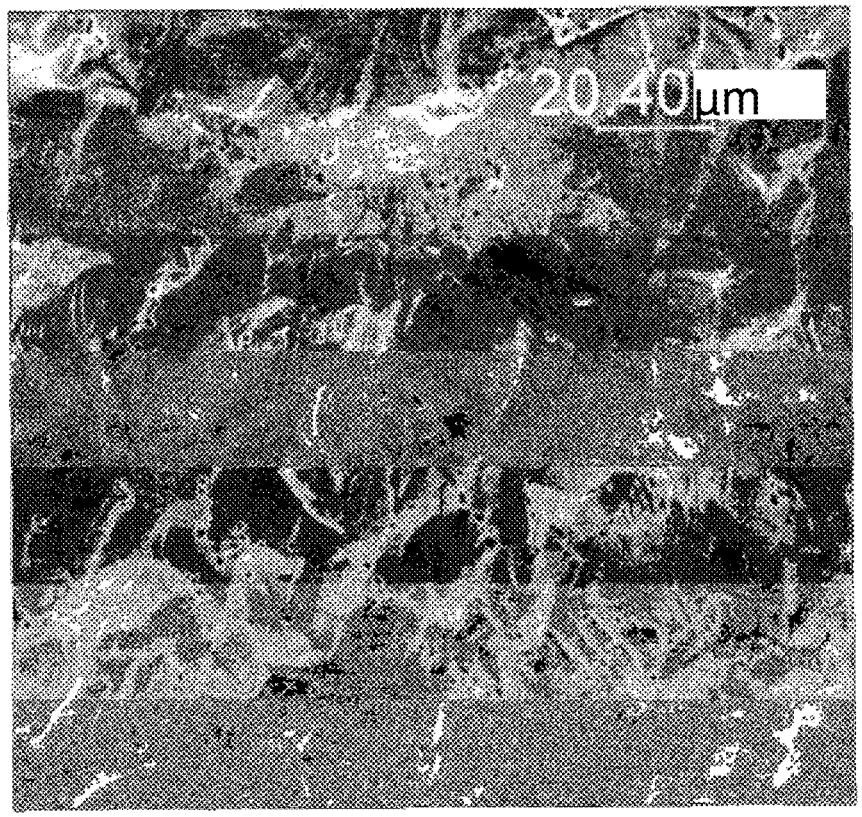
FIG. 2 shows the microstructure of the proposed nuclear fuel pellet of uranium dioxide with pore sizes between 1 and 200 nm making up 50% of the total pellet porosity.
Figure 3:
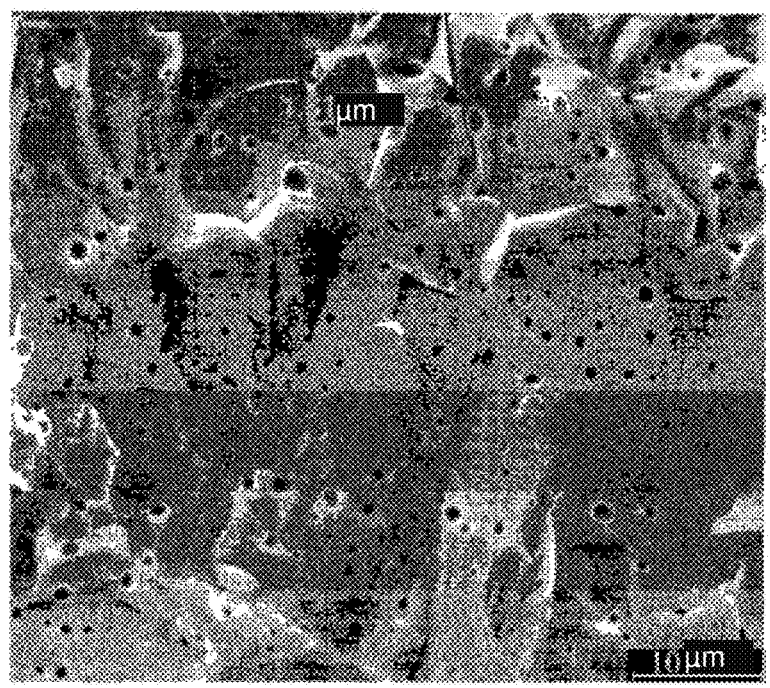
FIG. 3 shows the microstructure of the standard uranium dioxide nuclear fuel pellet.

The nuclear fuel pellet having enhanced thermal conductivity (hereinafter referred to as the "pellet") has a structure of pressed and sintered uranium dioxide powder (FIG. 1). The pellet structure is made up of pores of 1 to 5 μm in size evenly distributed along the grain boundaries, and nanopores between measured between 1 and 200 nm in size located inside the grains (FIG. 2). The latter make up at least 50% of the total porosity. Metal clusters of uranium chemical compounds with a valency of 0 and $2^+$ are surrounded by $UO_2$. The total content of metal clusters (the clusters) in the form of a mixture of uranium chemical compounds with a valency of 0 and $2^+$ is between 0.01 and 2 wt % and represent chemically bonded uranium cations (chemical bond U—U). Microhardness of such metal clusters is at least 1.5 time lower than the reference data. Due to metal clusters, the O/U ratio is reduced to 1.996-1.999 inside the grains, and O/U ratio is between 2.000 and 2.002 along the grain boundaries due to oxidation during storage in open air. This improves the pellet thermal conductivity. FIG. 3 shows the structure of the standard uranium dioxide nuclear fuel pellet without metal clusters for comparison.

Figure 4:
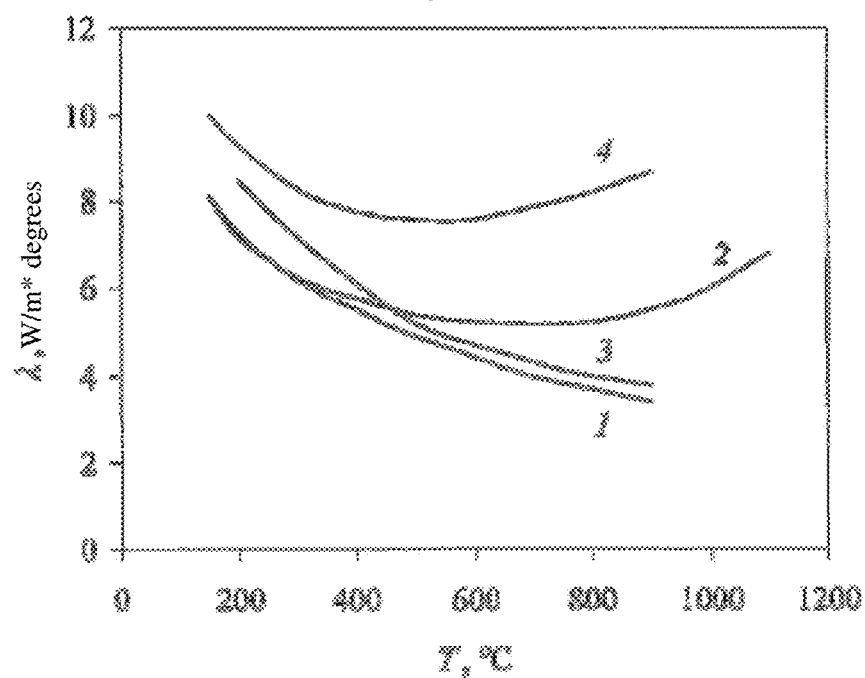
FIG. 4 shows the temperature-dependence plot of uranium dioxide nuclear fuel pellet thermal conductivity.

Pellet thermal conductivity increases as temperature increases above 500-600° C. and exceeds the reference and design data by 1.5 to 3 times at 1000° C. (FIG. 4, 5). It is attributable to the following. The nature of temperature dependence of thermal conductivity measured using the conventional axial thermal flux method for the proposed $UO_2$ pellet is very similar to the nature of temperature dependence of thermal conductivity for monocrystalline $UO_2$. For a monocrystal, thermal conductivity does not depend on its size or orientation. At 700° C., monocrystal thermal conductivity is 60% higher than the average thermal conductivity of the sintered polycrystalline $UO_2$. At 1000° C., monocrystal thermal conductivity is 5.9 W/m.deg., which is 2.4 times higher than the thermal conductivity of the sintered polycrystalline uranium dioxide.

To produce a nuclear fuel pellet with enhanced thermal conductivity, a method is applied that includes deposition of metal hydroxides in two stages with pH, incinerating, sintering of the uranium dioxide mixture powder, pressing, and application of an X-ray photon spectrometer. For the method implementation, deposition is performed by simultaneous draining of uranyl nitrate solutions and ammonia to the buffer at 55-60±2° C. in two stages. At the first stage, pH is maintained between 6.5 and 6.7, at the second stage, final deposition of polyuranate ammonia (PUA) is performed at pH level between 9.0 and 10.5. The incinerating is performed at temperatures between 600 and 680° C. until $UO_2$ reduction. Uranium metal is melted at a temperature exceeding 1150° C., and sintering is carried out in an insignificant amount of liquid phase at temperatures between 1600 and 2200° C. in a hydrogen-nitrogen medium until metal clusters are formed. Sintering in a liquid phase results in the required porosity and pellet structure. Pores with the size of 1 to 5 μm are formed along the grain boundaries, and nanopores with the size of ≤1 to 200 nm are formed inside the grains making up at least 50% of total porosity. The O/U ratio reduces to 1.996-1.999 in the $UO_2$-U system. Uranium dioxide is formed with dispersed metal clusters of uranium chemical compounds with a valency of $0$-$2^+$ surrounded by $UO_2$. The new structure of the $UO_2$ pellet and an additional U—U chemical bond are identified by means of an X-ray photon spectrometer showing that such metal clusters amount to from 0.01 to 2 wt % in the pellet.

In an embodiment with an extended range of method application and preparation of catalysts, the deposition is performed by simultaneous draining of the nitric-acid solution with uranium and added metal and ammonia to the buffer at 55-60±2° C. in two stages as well: At the first stage, pH is maintained between 7.0 and 7.2, at the second stage, final deposition of polyuranate ammonia (PUA) is performed at pH level between 8.0 and 8.5. Chromium, tin, titanium, aluminum, etc. are used as metal additives. Additives are catalysts contributing to partial, in the areas near the additives, reduction of uranium dioxide nanoparticles to uranium metal during pellet sintering.

When applying the standard technology, an ammonia-containing additive in the amount of 0.01 to 0.5% is stirred in mechanically to the $UO_2$ powder, wherein the following is used as such ammonia-containing additive: ammonia carbonate or bicarbonate, paraphenylenediamine, triazole, etc.

EXAMPLE 1

Nuclear fuel fillet having enhanced thermal conductivity was prepared as follows.

Deposition was performed by simultaneous draining of uranyl nitrate solutions and ammonia to the buffer at 55-60±2° C. in two stages. The ammonium solution was supplied to the ammonium polyuranate sediment bowl. At the first stage, pH was maintained between 6.5 and 6.7, at the second stage, final deposition of polyuranate ammonia (PUA) was performed at pH level between 9.0 and 10.5. The incinerating was performed at temperatures between 600 and 680° C. until $UO_2$ reduction. Uranium metal was melted at a temperature exceeding 1150° C., and sintering was carried out in an insignificant amount of liquid phase at 1750° C. in a hydrogen-nitrogen medium until metal clusters were formed. Sintering in a liquid phase resulted in the required porosity and pellet structure. The new structure of $UO_2$ pellet and an additional U—U chemical bond were identified using an X-ray photon spectroscope. The pellet structure has pores evenly distributed along the grain boundaries and inside the grains. Pores with the size of 1 to 5 μm were identified along the grain boundaries, and nanopores with from ≤1 to 200 nm were identified inside the grains making up at least 50% of total porosity. In addition, it was noted that the size of nanopores is even smaller than the microscope resolution, i. e. less than 1 nm. A the same time, sintered pellets in the $UO_2$—U system had a $UO_2$ phase composition and O/U ratio of 2.002 at grain boundaries and 1.998 inside grains. Dispersed metal clusters of uranium chemical compounds with a valency of $0$-$2^+$ surrounded by $UO_2$ were identified in the uranium dioxide structure. Such metal clusters of a mixture of uranium chemical compounds with a valency of 0 and $2^+$ amounted to 0.01-2 wt % of the pellet.

EXAMPLE 2

Nuclear fuel fillet having enhanced thermal conductivity was prepared as follows.

Deposition is performed by simultaneous draining of the nitric-acid solution with uranium and added metal and ammonia to the buffer at 55-60±2° C. in two stages as well. At the first stage, pH was maintained between 7.0 and 7.2, at the second stage, final deposition of polyuranate ammonia (PUA) was performed at pH level between 8.0 and 8.5. Chrome was used as an additive to metal. Additives contributed to partial, in the areas near the additives, reduction of uranium dioxide nanoparticles to uranium metal during pellet sintering. Then uranium metal was melted at a temperature exceeding 1150° C., and sintering was carried out in an insignificant amount of liquid phase at 1750° C. in a hydrogen-nitrogen medium until metal clusters were formed. Sintering in a liquid phase resulted in the required porosity and pellet structure. The new structure of $UO_2$ pellet and an additional U—U chemical bond were identified using an X-ray photon spectroscope. The pellet structure has pores evenly distributed along the grain boundaries and inside the grains. Pores with the size of 1 to 5 μm were identified along the grain boundaries, and nanopores with from ≤1 to 200 nm were identified inside the grains making up at least 50% of total porosity. In addition, it was noted that the size of nanopores is even smaller than the microscope resolution, i. e. less than 1 nm. At the same time, sintered pellets in the $UO_2$—U system had a $UO_2$ phase composition and O/U ratio of 2.002 at grain boundaries and 1.998 inside grains. Dispersed metal clusters of uranium chemical compounds with a valency of $0$-$2^+$ surrounded by $UO_2$ were identified in the uranium dioxide structure. Such metal clusters of a mixture of uranium chemical compounds with a valency of 0 and $2^+$ amounted to 0.01-2 wt % of the pellet.

EXAMPLE 3

In a uranium dioxide powder prepared by the standard method, 0.5 wt % of 4-amino-1,2,4-triazole powder (the triazole) was added by mechanical stirring. Pellets were pressed and sintered in a hydrogen medium at 1750° C. During sintering, the ammonium-containing triazole radical ion decomposed emitting hydrogen that contributed to the reduction of adjacent areas of uranium dioxide within the pellet volume. As a result, metal clusters and substoichiometric composition were formed in the internal part of pellets.

Then uranium metal was melted at a temperature exceeding 1150° C., and sintering was carried out in an insignificant amount of liquid phase at 1750° C. in a hydrogen-nitrogen medium until metal clusters were formed. Sintering in a liquid phase resulted in the required porosity and pellet structure. The new structure of $UO_2$ pellet and an additional U—U chemical bond were identified using an X-ray photon spectroscope. The pellet structure has pores evenly distributed along the grain boundaries and inside the grains. Pores with the size of 1 to 5 μm were identified along the grain boundaries, and nanopores with from ≤1 to 200 nm were identified inside the grains making up at least 50% of total porosity. In addition, it was noted that the size of nanopores is even smaller than the microscope resolution, i.e. less than 1 nm. A the same time, sintered pellets in the UO$_2$—U system had a UO$_2$ phase composition and O/U ratio of 2.001 at grain boundaries and 1.999 inside grains. Dispersed metal clusters of uranium chemical compounds with a valency of 0-2$^+$ surrounded by UO$_2$ were identified in the uranium dioxide structure. Such metal clusters of a mixture of uranium chemical compounds with a valency of 0 and 2+ amounted to 0.01-2 wt % of the pellet.

The invention claimed is:

1. A nuclear fuel pellet, comprising:
 a pellet structure of a pressed and sintered uranium dioxide powder;
 wherein the pellet structure is made up of evenly distributed pores among grains of the uranium dioxide powder;
 wherein nanopores and metal clusters of chemically bonded uranium cations are located inside the grains;
 wherein the nanopores are between 1 and 200 nm in size and comprise at least 50% of a total porosity of the pellet structure;
 wherein the metal clusters are surrounded by the uranium dioxide powder;
 wherein a total content of the metal clusters is between 0.01 and 2 wt %;
 wherein the nuclear fuel pellet has a thermal conductivity in a range of 7.6 to 8.7 W/m·degrees over a temperature range of 600° to 900° C.

* * * * *